United States Patent
Bello et al.

(10) Patent No.: US 8,204,876 B2
(45) Date of Patent: Jun. 19, 2012

(54) DYNAMIC MATERIALIZED VIEW RANGING

(75) Inventors: Randall G. Bello, Nashua, NH (US); John D. Raitto, Hollis, NH (US)

(73) Assignee: Oracle International Corporation, Redwood Shores, CA (US)

(*) Notice: Subject to any disclaimer, the term of this patent is extended or adjusted under 35 U.S.C. 154(b) by 290 days.

(21) Appl. No.: 11/374,593

(22) Filed: Mar. 13, 2006

(65) Prior Publication Data

US 2007/0214107 A1  Sep. 13, 2007

(51) Int. Cl.
*G06F 7/00* (2006.01)
(52) U.S. Cl. .................................................. 707/717
(58) Field of Classification Search .............. 707/2, 717, 707/718
See application file for complete search history.

(56) References Cited

U.S. PATENT DOCUMENTS

| | | | | |
|---|---|---|---|---|
| 5,991,754 A * | 11/1999 | Raitto et al. | ............... | 707/2 |
| 5,999,192 A * | 12/1999 | Selfridge et al. | ............... | 345/440 |
| 6,026,390 A * | 2/2000 | Ross et al. | ............... | 707/2 |
| 6,219,660 B1 * | 4/2001 | Haderle et al. | ............... | 707/718 |
| 6,275,818 B1 * | 8/2001 | Subramanian et al. | ............... | 707/2 |
| 2004/0122804 A1 * | 6/2004 | Zhang et al. | ............... | 707/3 |
| 2006/0047696 A1 * | 3/2006 | Larson et al. | ............... | 707/103 R |

OTHER PUBLICATIONS

Goldstein et al., Optimizing Queries Using Materialized Views: A Practical Scalable Solution, ACM SIGMOD 2001, published May 21, 2001.*
Prasenjit Mitra, An Algorithm for Answering Queries Efficiently Using Views, IEEE 2001, pp. 99-106.*
Dr. Lilian Hobbs, Oracle Materialized Views & Query Rewrite, (An Oracle White Paper), May 2005, pp. 1-24, Oracle Corp., Redwood Shores, CA.
Oracle International Corp., Oracle Database—Data Warehousing Guide, 10g Release 1 (10.1), Dec. 2003, pp. 1-13, Oracle, Redwood Shores, CA, USA.

* cited by examiner

*Primary Examiner* — Jensen Hu
(74) *Attorney, Agent, or Firm* — Kraguljac Law Group LLC (57) ABSTRACT

Systems, methods, media, and other embodiments associated with dynamically ranging over a set of materialized views to determine whether to associate a materialized view with a query at execution time are described. One example system may include a materialized view creation time logic that is configured to identify a materialized view, to create a containment expression, and to relate the containment expression to the materialized view. The example system may also include an execution time logic that is configured to receive a query having a bind variable. The execution time logic may dynamically range over materialized views to determine whether to use a materialized view(s) to process the query having the bind variable.

27 Claims, 7 Drawing Sheets

DYNAMIC MATERIALIZED VIEW RANGING

SUMMARY

In one embodiment a method is provided that comprises receiving a query that includes an unresolved bind variable. One or more materialized views are identified from which data can be provided to respond to the query. The method also includes creating one or more containment expressions for determining whether one or more materialized views contain data responsive to an execution query having a bind variable.

BACKGROUND

As databases continue to grow in size, query efficiency continues to grow in importance. Queries made against large (e.g., terabyte) databases having a large number (e.g., thousands) of tables may take an unacceptably long period of time to complete. Thus structures (e.g., indexes, materialized views) may work in concert with tools (e.g., query rewriters) to attempt to shorten query response time. However, complications arising from the fact that queries may include execution time bind variables (e.g., user bind variables) may reduce the interoperability of these tools and structures.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Handling a database query may include receiving a query, compiling the query, and executing the query. When executing, the query may access a materialized view instead of accessing a base table. A materialized view (MV) can be thought of as a realization (e.g., saving) of the results of a query. A materialized view thus may store pre-fetched and/or pre-computed results that can be accessed by a subsequently executed query. Accessing an MV may save time as compared to accessing a base table. Therefore, a number of MVs may be created in anticipation of certain queries being made. These MVs may be created at a time referred to as MV creation time, which may precede query compilation time and query execution time. When a query is received it may be compiled. Additionally, when a query is received, it may be rewritten. During this compile time processing, an MV(s) may be selected for use by the query. These MVs may be selected from the MVs that were created at MV creation time. When the query is executed, results may be retrieved from the selected MVs rather than from a base table.

Consider a database that stores sales data for items sold in members of a set of stores. A sales analyst may want to query the database for sales information. For example, the analyst may want to know the total sales for each store in a given city (e.g., Boston) or may want to know the total amount sold of an item. The database may include a separate row for each sale in each store and thus the desired information may appear in thousands of rows selected from hundreds of thousands of rows. Finding this information may be time consuming.

Indexes and materialized views can facilitate reducing the amount of time required to respond to queries. For example, a materialized view for all the stores in Boston may only have several hundred rows. Thus, the example query for acquiring sales totals in Boston could be satisfied by computing a sum from the hundreds of rows in the MV rather than by first selecting rows from much larger tables and then performing the sum. The query will likely complete faster when satisfied from the MV rather than from underlying base tables.

If work performed by the analyst is well known, for example the analyst repeatedly makes similar queries, then even more precise and thus more concise MVs can be created to support these well known queries. A set of well known queries may be referred to as a "workload". While additional memory (e.g., disk space) may be required to store the MVs, and while additional processor cycles may be required to create and/or update the MVs, their existence and usage may dramatically improve query response time. Unfortunately, the presence of execution time bind variables may reduce and/or eliminate the usefulness of this form of query performance optimizing.

In one example, a materialized view can be created at materialized view creation time by an SQL statement(s). The SQL statement(s) may describe a row(s) and/or column(s) to select from a base table and to organize into a materialized view. The SQL statement(s) may be performed and the results saved in a named table(s). The MV may be created at an MV creation time that precedes both a query "compile time" and a query "execution time". At compile time, a query may be examined and a query rewriter may determine that an available MV(s) can be used to satisfy the query. Thus, the query rewriter may facilitate preventing a time-consuming access to underlying tables from which a materialized view is created by directing the query to access the MV instead.

A query rewriter (e.g., query rewriting logic) may examine a query, determine that a portion and/or all of the query may be satisfied by accessing an MV, and may therefore "rewrite" the query to access the MV instead of an underlying table. For example a query Select*from table Stores where city=Boston    ($Q_1$)

may be rewritten as

Select*from MV Stores$_{Boston}$    ($Q_2$)

when an appropriate MV (e.g., Stores$_{Boston}$) is available.

However, a query rewriter may encounter issues when a query includes a bind variable. There are different types of bind variables.

When a query includes a variant (e.g., bind variable), then conventional compile time logic may not be able to determine which, if any, MVs to select and conventional execution time logic may not be able to determine which, if any, MVs will support a query. Additionally, conventional MV creation time logic may not be able to determine which, if any MVs to create to support the compile time query rewriting and/or execution time MV selection.

Consider an example where a materialized view stores results for a query:

Select*from table STORES where city=Boston (Q₁)

now consider another query:

Select*from table STORES where city=$bv_1$ (Q₄)

$bv_1$=a bind variable whose value is unknown until execution time.

An MV creation time logic may not be able to determine which MVs, if any, to create to support $Q_4$. Thus, there is a disconnect between MV creation time MVs, compile time logic, and execution time queries with bind variables. The disconnect occurs because it is difficult to determine whether a materialized view contains potentially relevant data until execution time.

Thus, example systems and methods described herein concern establishing a plan for determining a materialized view(s) to create at MV creation time and then determining which, if any, of the MVs can be used to satisfy, partially and/or completely, an execution time query that includes an execution time bind variable. An execution time query may be thought of as being a run time instance of a query that may be related to a query analyzed at MV creation time. A query analyzed at MV creation time may be an example query that an administrator anticipates will be received at run time.

In one example, systems and methods described herein may rework queries to include ranges for bind variables so that bind variables are at least partially constrained and so that a set of MVs that cover all possible values for the bind variable can be created. To achieve the constraining, artificial ranges (e.g., negative infinity to positive infinity) may be established. While artificial, this may allow making creation time MVs that may improve query performance. While the improvement may not equal that possible for MVs associated with fully constrained bind variables and may not provide complete coverage for all values of a bind variable, the conventional disconnect can be overcome at least in part by using these MVs.

Consider the following set of anticipated queries analyzed at MV creation time.

Select . . . where city=Boston (Q₅)

Select . . . where city=New York (Q₆)

Select . . . where city=$BV_2$ (Q₇)

In one example, a materialized view will be created to support $Q_5$. This MV will store rows where city=Boston. In the example, a materialized view will also be created to support $Q_6$. This MV will store rows where city=New York. In the example, a third MV may also be created. This MV may store rows where city !=Boston and city !=New York. Thus, a materialized view is available to support the anticipated queries $Q_5$, $Q_6$, and $Q_7$, where performance for $Q_5$ and $Q_6$ will be greatly improved over base table access and performance for $Q_7$ will be at least partially improved over base table access.

At execution time, when the bind variable value is available in a query, execution time logic may range over (e.g., examine) the available MVs to determine which MVs, if any, support the query and whether base table access is required. Notice that if the bind variable value is Boston or New York that greatly improved query performance may occur since precise, concise MVs exist for those values of the bind variable.

While the previous example concerned non-continuous data (e.g., city names), a similar ranging approach can be taken with continuous data (e.g., age, salary). Consider a query with a bind variable for age:

Select . . . where age=$BV_{age}$ (Q₈)

One or more MVs can be created to support this query. For example a first MV could be created where the range for $BV_{age}$ is 0 to ∞ (infinity). This MV would be large but would certainly support a query. It may even provide some performance improvement by including only rows for which an age value is available. However, in one example, a set of MVs may be created to facilitate dynamic execution time MV ranging that may provide more improved performance. By way of illustration, MVs for age ranges 0-18
19-39
40-65
65-infinity may be created based on information known about potential queries. In the illustration the ranges may have been selected based on queries anticipated for a social security application. In another application (e.g., life insurance) the ranges may have been 0-19, 20-39, 40-49, 50-59, 60-69, 70-79, 80-infinity. Thus, a series of MVs with different ranges can be established at MV creation time. Then, at execution time, when the value of the bind variable is known, one or more MVs can be selected by dynamically ranging over the available MVs.

For example, if $BV_{age}$=21, one MV can be selected. Additionally if $BV_{age}$ is specified as a range (e.g., $10<x<39$) then one or more MVs may support the query as determined at execution time. Selecting a materialized view based on a bind variable value implies a linkage between MVs and bind variables. This linkage may be provided, for example, by containment expressions being associated with a materialized view.

Returning to the non-continuous data example, MVs may be created for frequently queried values for a bind variable (e.g., New York, Boston). However, a materialized view may not be created for less frequently queried values (e.g., Jamestown). Thus, at execution time, in one example an execution time logic may determine that no MV stores data for city=Jamestown by evaluating a containment expression(s). Since no MV would be found, base table access may occur. In another example, an execution time logic may determine that a materialized view is available for a query with a different value for the bind variable. Once again, the determination may be made by evaluating a containment expression(s).

Thus, example systems and methods may facilitate selecting and creating, at MV creation time, a minimum set of MVs and, if needed, base tables, that can potentially return all rows to satisfy a query. The example systems and methods may then create containment expressions that facilitate determining which MVs and/or base tables will satisfy a query. At compile time, one or more MVs may be selected as being potentially useful to a query. Thus, at execution time, example systems and methods may in effect dynamically range over the available and/or selected MVs by evaluating the containment expressions in light of the actual value for a bind variable. In some examples, the MVs created at MV creation time and selected at compile time may have associated metadata that facilitates locating containment expressions and/or evaluating containment expressions.

When a query (e.g., SQL query) has a bind variable, the query may be unconstrained. Thus, it may be difficult to create MVs to support the unconstrained query. While it may be difficult, determining a set of MVs that may cover a range of values for the bind variable may be possible. In some cases, MVs may provide disjoint and/or overlapping coverages for various ranges. The number and/or type of MVs created may depend on an understanding of a workload (e.g., known or anticipated set of queries). This understanding may facilitate building a plan for handling the known and/or anticipated set of queries.

With the MVs available, a compile time logic and/or an execution time logic may determine whether a materialized view will be used to process a query and/or whether a query will be rewritten. The determination may be made based, at least in part, on evaluating a containment expression associated with a materialized view. Evaluating a containment expression at execution time delays MV selection time to a point that facilitates using MVs to support queries having execution time bind variables.

The following includes definitions of selected terms employed herein. The definitions include various examples and/or forms of components that fall within the scope of a term and that may be used for implementation. The examples are not intended to be limiting. Both singular and plural forms of terms may be within the definitions.

As used in this application, the term "computer component" refers to a computer-related entity, either hardware, firmware, software, a combination thereof, or software in execution. For example, a computer component can be, but is not limited to being, a process running on a processor, a processor, an object, an executable, a thread of execution, a program, and a computer. By way of illustration, both an application running on a server and the server can be computer components. One or more computer components can reside within a process and/or thread of execution and a computer component can be localized on one computer and/or distributed between two or more computers.

"Computer communication", as used herein, refers to a communication between two or more computing devices (e.g., computer, personal digital assistant (PDA), cellular telephone) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, and so on.

"Computer-readable medium", as used herein, refers to a medium that participates in directly or indirectly providing signals, instructions and/or data. A computer-readable medium may take forms, including, but not limited to, non-volatile media, and volatile media. Non-volatile media may include, for example, optical or magnetic disks and so on. Volatile media may include, for example, semiconductor memories, dynamic memory and so on. Common forms of a computer-readable medium include, but are not limited to, a floppy disk, a flexible disk, a hard disk, a magnetic tape, other magnetic medium, a CD-ROM, other optical medium, other physical medium with patterns of holes, a RAM, a ROM, an EPROM, a FLASH-EPROM, or other memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores.

"Data store", as used herein, refers to a physical and/or logical entity that can store data. A data store may be, for example, a database, a table, a file, a list, a queue, a heap, a memory, a register, and so on. A data store may reside in one logical and/or physical entity and/or may be distributed between two or more logical and/or physical entities.

"Logic", as used herein, includes but is not limited to hardware, firmware, software in execution and/or combinations of each to perform a function(s) or an action(s), and/or to cause a function or action from another logic, method, and/or system. For example, based on a desired application or needs, logic may include a software controlled microprocessor, discrete logic (e.g., application specific integrated circuit (ASIC)), an analog circuit, a digital circuit, a programmed logic device, a memory device containing instructions, and so on. Logic may include one or more gates, combinations of gates, or other circuit components. Logic may also be fully embodied as software in execution. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities including a processor, operating system, a logic, software, or other entity. Logical and/or physical communication channels can be used to create an operable connection.

"Query", as used herein, refers to a semantic construction that facilitates gathering and processing information. A query may be formulated in a database query language like structured query language (SQL) or object query language (OQL). A query may be implemented in computer code (e.g., C#, C++, Javascript) for gathering information from various data stores and/or information sources.

"Signal", as used herein, includes but is not limited to one or more electrical or optical signals, analog or digital signals, data, one or more computer or processor instructions, messages, a bit or bit stream, or other means that can be received, transmitted and/or detected.

"Software", as used herein, includes but is not limited to, one or more computer instructions and/or processor instructions that can be read, interpreted, compiled, and/or executed by a computer and/or processor. Software causes a computer, processor, or other electronic device to perform functions, actions and/or behave in a desired manner. Software may be embodied in various forms including routines, algorithms, modules, methods, threads, and/or programs. In different examples software may be embodied in separate applications and/or code from dynamically linked libraries. In different examples, software may be implemented in executable and/or loadable forms including, but not limited to, a stand-alone program, an object, a function (local and/or remote), a servelet, an applet, instructions stored in a memory, part of an operating system, and so on. In different examples, computer-readable and/or executable instructions may be located in one logic and/or distributed between multiple communicating, co-operating, and/or parallel processing logics and thus may be loaded and/or executed in serial, parallel, massively parallel and other manners.

Suitable software for implementing the various components of the example systems and methods described herein may be crafted from programming languages and tools including Java, Pascal, C#, C++, C, CGI, Perl, SQL, APIs, SDKs, assembly, firmware, microcode, and so on. Software, whether an entire system or a component of a system, may be embodied as an article of manufacture and maintained or provided as part of a computer-readable medium as defined previously.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, calculating, determining, displaying, and so on, refer to actions and processes of a computer system, logic, processor, or similar electronic device that manipulates and transforms data represented as physical (electronic) quantities.

Figure 1:
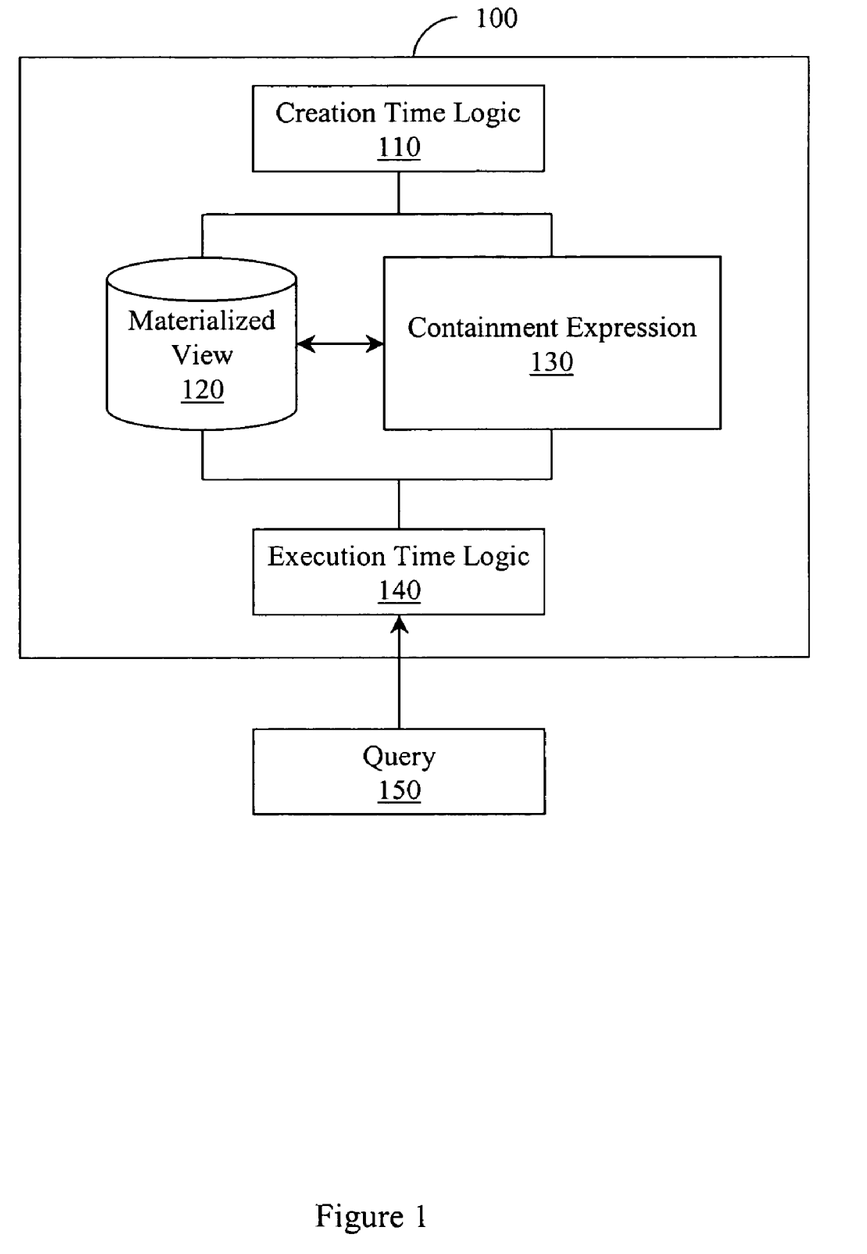
FIG. 1 illustrates an example system associated with dynamic materialized view ranging.

FIG. 1 illustrates a system 100 associated with dynamic materialized view ranging. System 100 may include a materialized view creation time logic 110 that is configured to identify a materialized view 120. In one example, creation time logic 110 may go beyond identifying the materialized view 120 and may create the materialized view 120 that may be useful for handling a query whose potential future processing is being analyzed. While a single materialized view 120 is illustrated, it is to be appreciated that creation time logic 110 may identify and/or create more than one materialized view to facilitate processing for the query being analyzed. These materialized views may overlap, may be disjoint, may completely cover a data space, and/or may be partially cover a data space.

Creation time logic 110 may also be configured to create a containment expression 130 that is associated with the materialized view 120. Once again, while a single containment expression 130 is illustrated, it is to be appreciated that creation time logic 110 may create more than one containment expression. After identifying the materialized view 120 and creating the containment expression 130, the creation time logic 110 may create a relationship between the containment expression 130 and the materialized view 120. Creating the relationship may include, for example, manipulating metadata associated with the materialized view 120 and/or the containment expression 130. By way of illustration, a containment expression may include metadata that describes the materialized views with which it is associated. Similarly, a materialized view may include metadata that describes containment expressions with which it is associated. While metadata is described, it is to be appreciated that the relationship may be created by other approaches including, for example, manipulating a database table, manipulating a data structure, and so on. Creating the containment expression and/or the metadata and establishing a relationship with a materialized view may facilitate making decisions at later times like compile time and/or execution time.

System 100 may also include an execution time logic 140 that is configured to receive a query 150 for which items are to be retrieved. The query 150 may include a bind variable. In one example, the query 150 may be an SQL query. Thus, in the example, a bind variable in the query 150 may be located in a where clause, in a having clause, and so on. The execution time logic 140 may be configured to dynamically range over available materialized views to determine whether to employ any particular materialized view(s) to process the query. Whether a materialized view is selected to process the query 150 may depend, at least in part, on evaluating a containment expression(s). The result of evaluating a containment expression may identify whether a materialized view contains data of interest to the query 150. The containment expression may be evaluated using a value for a bind variable found in the query 150.

A containment expression may include terms associated with continuous valued bind variables (e.g., age, salary). A containment expression may also include terms associated with discrete valued bind variables (e.g., name). Thus, materialized views that may be accessed in response to evaluating a containment expression may also include data concerning continuous and/or discrete valued variables. In some examples, after evaluating a set of containment expressions, it may be determined that a materialized view has data responsive to a query. However, in other examples it may be determined that no materialized view has data responsive to a query. Thus, the execution time logic 140 may be configured to selectively process the query using the materialized view.

Figure 2:
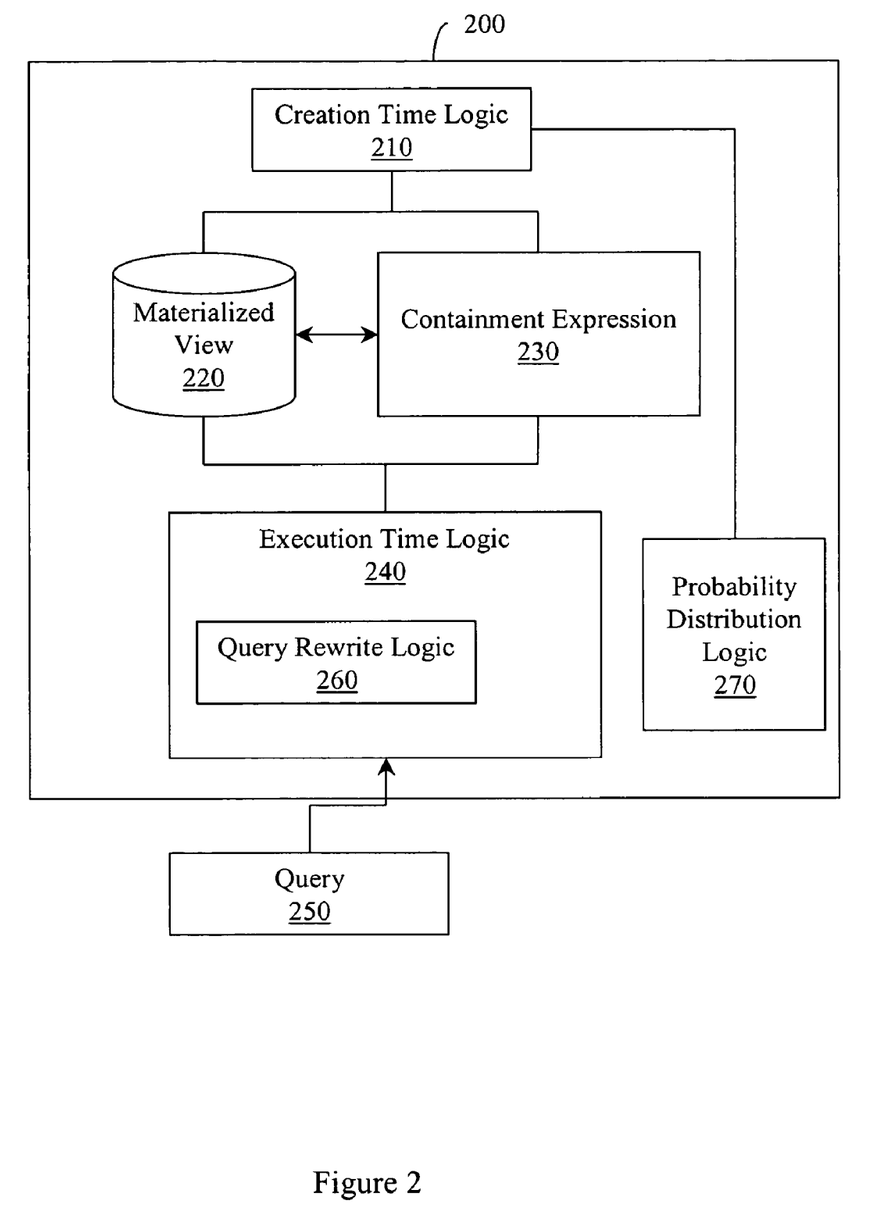
FIG. 2 illustrates another example system associated with dynamic materialized view ranging.

FIG. 2 illustrates a system 200 associated with dynamic materialized view ranging. System 200 includes some components similar to those described in FIG. 1. For example, system 200 includes a creation time logic 210 that identifies and/or creates materialized views 220 and that creates containment expressions 230. System 200 may also include an execution time logic 240 that is configured to receive queries 250 having execution time bind variables. Once again, while a single materialized view 220, containment expression 230, and query 250 are illustrated, it is to be appreciated that system 200 may work with multiple materialized views, containment expressions, and queries.

In addition to these similar elements system 200 may include other elements. For example, the execution time logic 240 may be configured with a query rewrite logic 260 that is configured to selectively rewrite query 250 to reference a materialized view when a useful materialized view is available. By way of illustration, query 250 may identify a table from which data is to be retrieved. Query rewrite logic 260 may remove the reference to the table and insert a reference to the useful materialized view.

In system 200, the creation time logic 210 may also have additional functionality. For example, the creation time logic 210 may be configured to produce a set of materialized views and a set of containment expressions associated with the set of materialized views. In one example, the set of materialized views may be selected to provide non-overlapping coverage for a range of values for a bind variable(s) associated with an execution time instance of a query. A pre-execution time example query may be analyzed to determine which MVs to create to support an execution time query. The set of materialized views may be selected based, at least in part, on a probability distribution for values for the bind variable(s). This probability distribution may be provided, for example, by a probability distribution logic 270.

To compute the probability distribution, the probability distribution logic 270 may interact with items including, for example, a workload (e.g., set of known queries), artificial intelligence that analyzes query history, a query analyst, and so on. Creation time logic 210 may determine that certain values are more likely to be queried and thus may create materialized views and/or containment expressions to exploit this likelihood. Similarly, creation time logic 210 may determine that certain other values are less likely to be queried and thus may forego creating materialized views to support these infrequently queried values.

Figure 3:
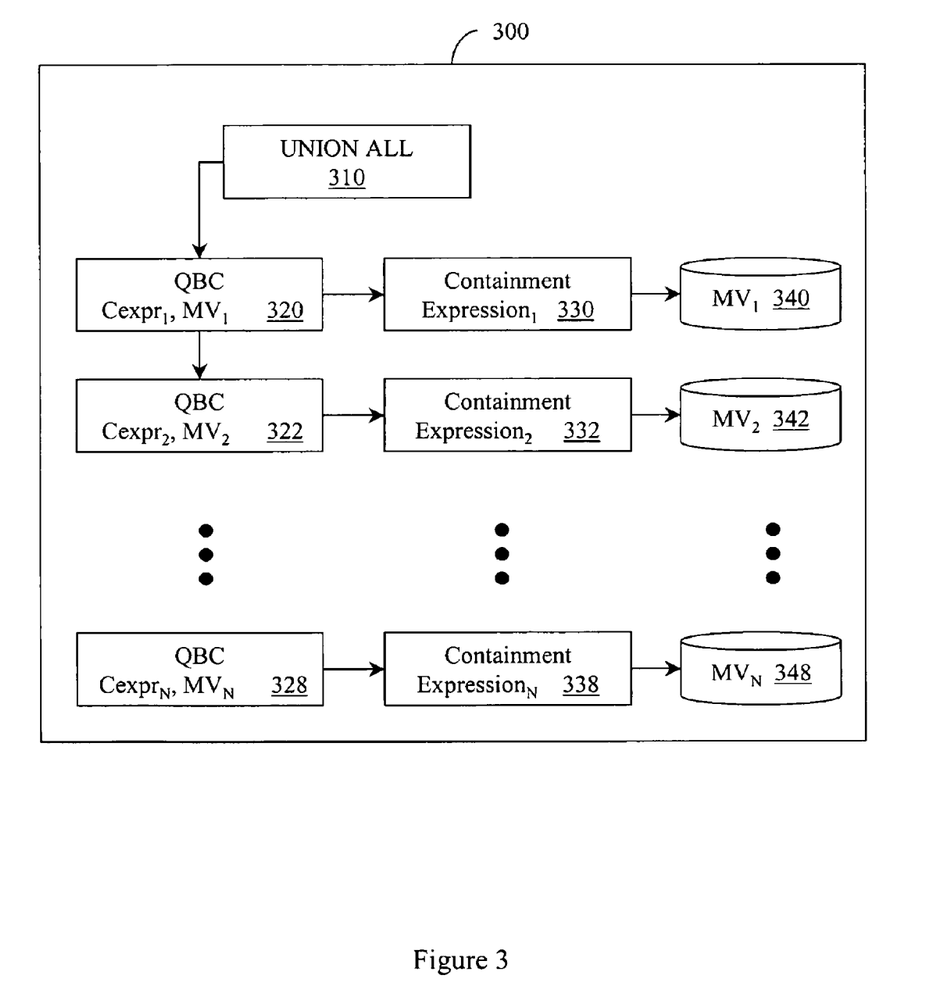
FIG. 3 illustrates an example set of data structures associated with dynamic materialized view ranging.

FIG. 3 illustrates an example set 300 of data structures associated with dynamic materialized view ranging. The set 300 of data structures includes a UNION ALL structure 310 from which a set of child query blocks (QBC) (320, 322, . . . 328) can be created. The child query blocks can be configured to provide a range of coverage for different execution time instances of a query analyzed at creation time. Thus, the child query blocks can be used to partition a data space covered by a set of base tables into smaller data spaces that may be covered by a materialized view(s) (340, 342, . . . 348). A child query block may be associated with a containment expression (330, 332, . . . 338) that is configured to be evaluated at execution time. A containment expression may evaluate to true or false based on the value of a bind variable. If a containment expression evaluates to true then a materialized view (340, 342, . . . 348) associated with the containment expression may be assigned to a query. Thus, rather than the query accessing a base table to retrieve values it may access the assigned materialized view.

Example methods may be better appreciated with reference to flow diagrams. While for purposes of simplicity of explanation, the illustrated methods are shown and described as a series of blocks, it is to be appreciated that the methods are not limited by the order of the blocks, as some blocks can occur in different orders and/or concurrently with other blocks from that shown and described. Moreover, less than all the illustrated blocks may be required to implement an example method. Blocks may be combined or separated into multiple components. Furthermore, additional and/or alternative methods can employ additional, not illustrated blocks. While the figures illustrate various actions occurring in serial, it is to be appreciated that in some examples some actions could occur concurrently, substantially in parallel, and/or at substantially different points in time.

Illustrated elements denote "processing blocks" that may be implemented in logic. In one example, the processing blocks may represent executable instructions that cause a computer, processor, and/or logic device to respond, to perform an action(s), to change states, and/or to make decisions. Thus, example methods may be implemented as processor executable instructions and/or operations provided by a computer-readable medium. Example processing blocks may also represent functions and/or actions performed by functionally equivalent circuits including an analog circuit, a digital signal processor circuit, an application specific integrated circuit (ASIC), or other logic device.

Figure 4:
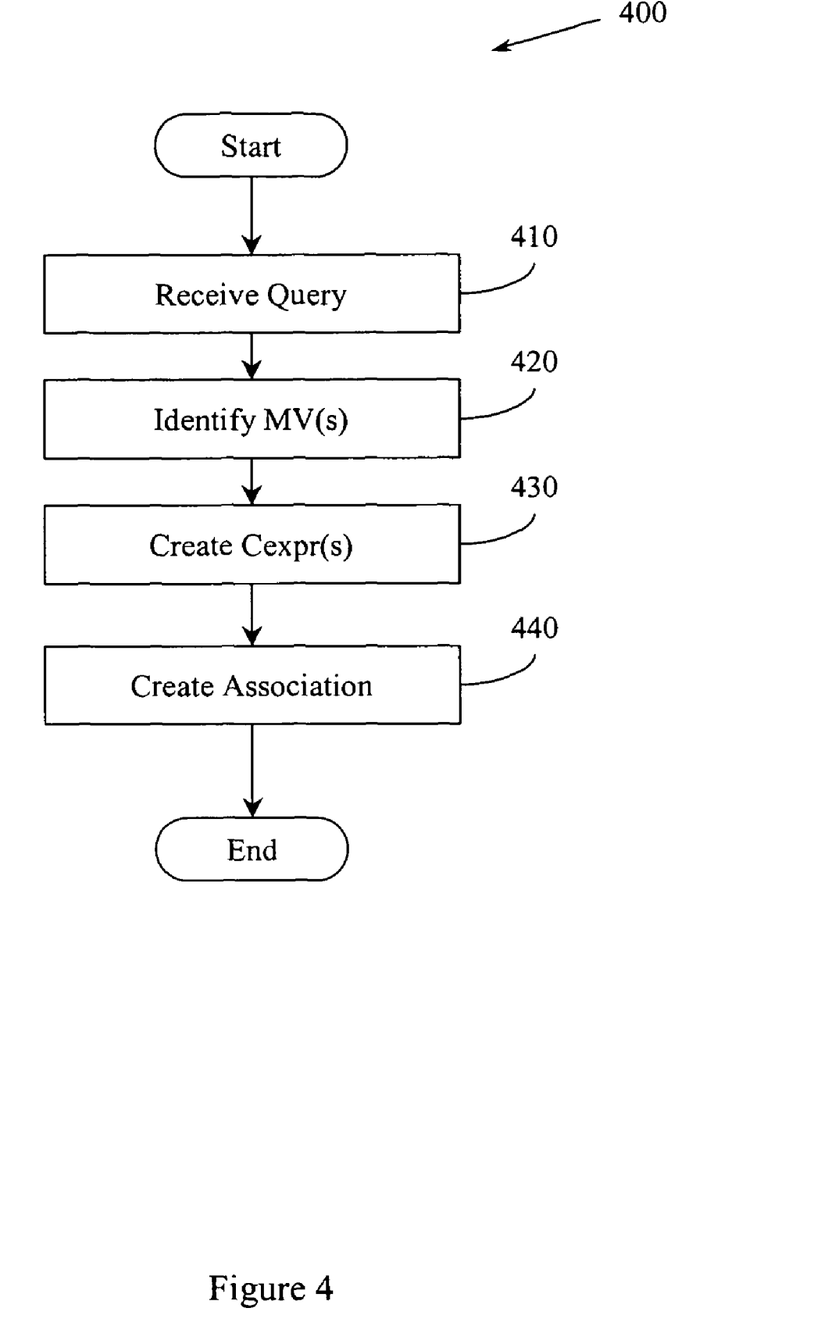
FIG. 4 illustrates an example method associated with dynamic materialized view ranging.

FIG. 4 illustrates a method 400 associated with dynamic materialized view ranging. Method 400 may include, at 410, receiving a query to analyze, where the query includes an unresolved bind variable. This query may be received at a materialized view creation time that precedes a query compile and query execution time. In one example, a set of queries available in a workload may be received for analysis. Rather than being able to ascertain at creation time a materialized view(s) that will certainly provide data relevant to the query, a number of materialized views may be needed to cover an execution time instance of the query. The query received may be representative of the type of queries that may be processed later at compile and/or execution time and for which results are expected to be returned.

Thus, method 400 may also include, at 420, identifying a materialized view(s) from which data can be provided to respond to the query being analyzed. In one example the materialized views may be mutually exclusive and have no overlap. In other examples, the materialized views may overlap. In some examples a materialized view may be identified that does not exist. Thus, method 400 may also include, in one example, creating a materialized view at this time before queries are received for compilation and/or execution. Identifying and/or creating materialized views at this time establishes data structures that can be used at compile time and/or at execution time to select a materialized view from which data can be extracted. Containment expressions provide expressions that help determine which of these data structures to use.

Thus, method 400 may include, at 430, creating a containment expression(s) that is configured to facilitate determining whether a materialized view(s) contains data responsive to an execution query having a bind variable. In different examples the containment expression may deal with continuous and/or discrete valued variables. An execution query may be thought of as being a run time instance of a query that may be related to a query analyzed at MV creation time.

A containment expression standing alone may have limited value. Thus, method 400 may also include, at 440, creating an association(s) between a materialized view(s) and a containment expression(s). Since materialized view selection will be based, at least in part, on a bind value variable, the association(s) may also be based on possible values for the bind variable. For example, a first containment expression may evaluate to true when a bind variable value falls within a first range (e.g., 10<age<29) while a second containment expression may evaluate to true when a bind variable value falls within a second range (e.g., 30<age<39).

Method 400 establishes structures that may be used at compile time and/or at execution time to select a materialized view(s) to support a query. Therefore, in one example, method 400 could be extended to include receiving an execution query that includes a value for a bind variable. This value for the bind variable could be used to evaluate containment expressions to identify relevant MVs. Thus, method 400 could also include selecting containment expressions to evaluate based, at least in part, on the value for the bind variable. Having selected containment expressions to evaluate, the method 400 may continue by determining whether to relate a materialized view(s) to the execution query based, at least in part, on evaluating the selected containment expressions using the value for the bind variable.

If a materialized view(s) is determined to be relevant, then method 400 could continue by selectively accessing a materialized view(s) to acquire data responsive to at least a portion of the execution query. The method 400 could also selectively access a base table(s) to acquire data responsive to at least a portion of the execution query. In some examples where materialized views provide complete coverage, no base table access may occur. Similarly, in some examples where materialized views provide no coverage, only base table access may occur.

While FIG. 4 illustrates various actions occurring in serial, it is to be appreciated that various actions illustrated in FIG. 4 could occur substantially in parallel. By way of illustration, a first process could receive queries for which materialized views may be created, a second process could identify materialized views, a third process could create containment expressions, and a fourth process could create associations between materialized views and containment expressions. While four processes are described, it is to be appreciated that a greater and/or lesser number of processes could be employed and that lightweight processes, regular processes, threads, and other approaches could be employed.

In one example, methods are implemented as processor executable instructions and/or operations stored on a computer-readable medium. Thus, in one example, a computer-readable medium may store processor executable instructions operable to perform a method that includes receiving and analyzing at a materialized view creation time a query that includes an unresolved bind variable. They query may be part of an available workload of queries. The method may also include identifying materialized views from which data can be provided to respond to the query, creating containment expressions for determining whether materialized views contain data responsive to an execution query having a bind variable, and creating an association between the materialized views and the containment expressions. The association may be based on possible values for the bind variable. With the materialized views, containments expressions, and associations created, the method may include receiving an execution query that includes a value for a bind variable and selecting containment expressions to evaluate based, at least in part, on the value. The method may also include determining whether to relate materialized views to the execution query based, at least in part, on evaluating the containment expressions using the value for the bind variable. While this method is described being stored on a computer-readable medium, it is to be appreciated that other example methods described herein may also be stored on a computer-readable medium.

Figure 5:
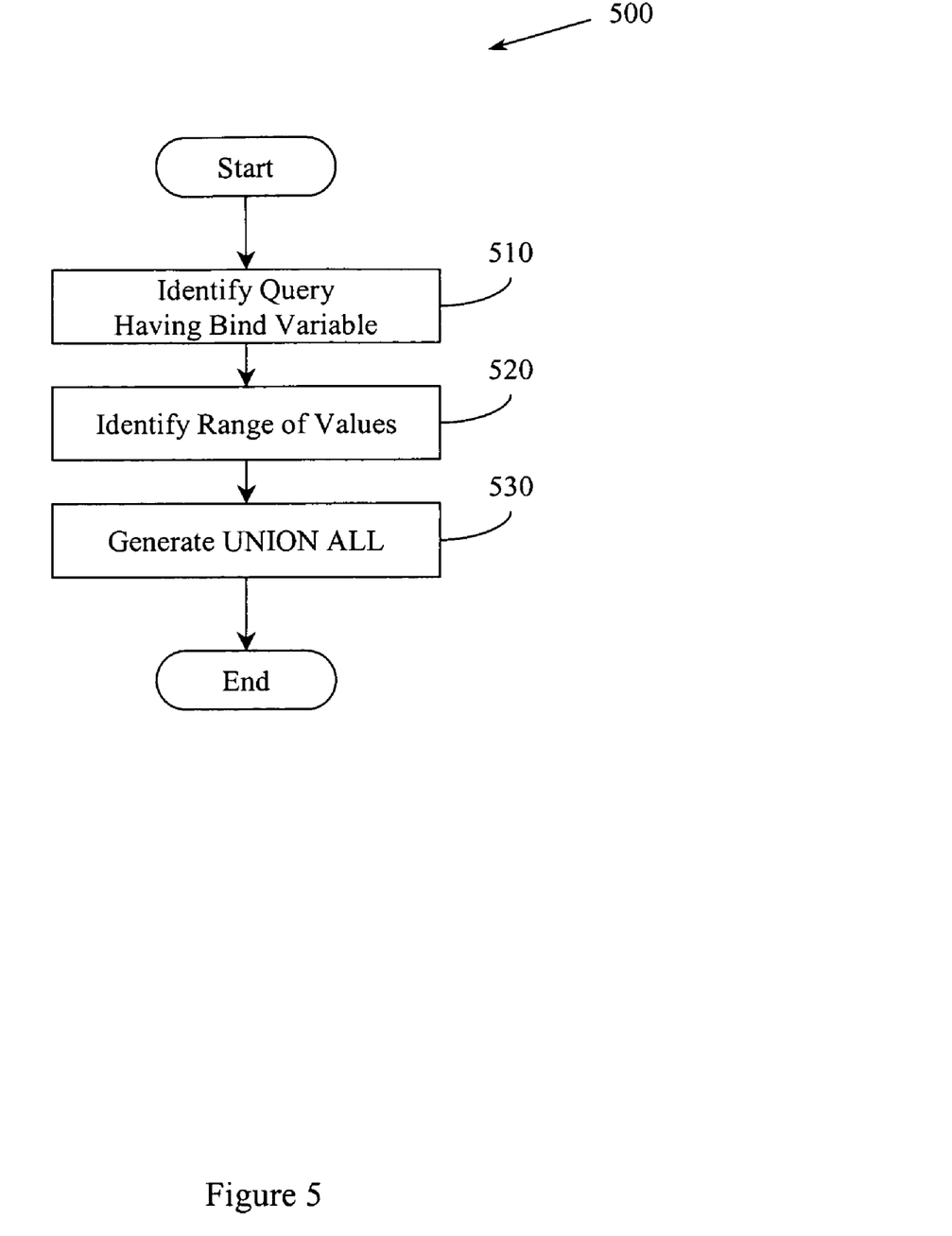
FIG. 5 illustrates an example method associated with dynamic materialized view ranging.

FIG. 5 illustrates a method 500 associated with dynamic materialized view ranging. Method 500 may include, at 510, at materialized view creation time, identifying a query having a bind variable and, at 520, also at materialized view creation time, identifying a range of possible values for the bind variable. In one example, the query may be a member of a workload of queries to be analyzed. The range of possible values may guide decisions concerning materialized views to identify and/or to create to support an execution time instance of the query. A query to analyze may include a bind variable whose value will not be known until execution time. However, the range of possible values for the bind variable may be known. Thus, materialized views can be identified and or created to support an execution instance of the query where the bind variable will be resolved (e.g., value known). In some examples, information about a probability distribution associated with the query to be analyzed may be available to guide materialized view identification and/or creation.

Method 500 may also include, at 530, at materialized view creation time, generating a UNION ALL query block that is configured to facilitate producing a set of child query blocks. The child query blocks may provide a range of coverage for different execution time instances of the query to be analyzed. Thus, a child query block may be associated with a containment expression that is configured to be evaluated at execution time and to evaluate to true or false based on the value of a bind variable.

With the creation time structures and expressions created, in one example method 500 may continue at execution time by receiving a query having a determined bind variable value. A "determined" bind variable value refers to a bind variable whose value is known. Thus, "determined" and "resolved" as used herein to refer to a bind variable whose value is known and available. Method 500 may therefore include selectively identifying at execution time a materialized view that is configured to provide data responsive to the query having the value. Which, if any, materialized view to use may be based on evaluating containment expressions related to the bind variable.

Figure 6:
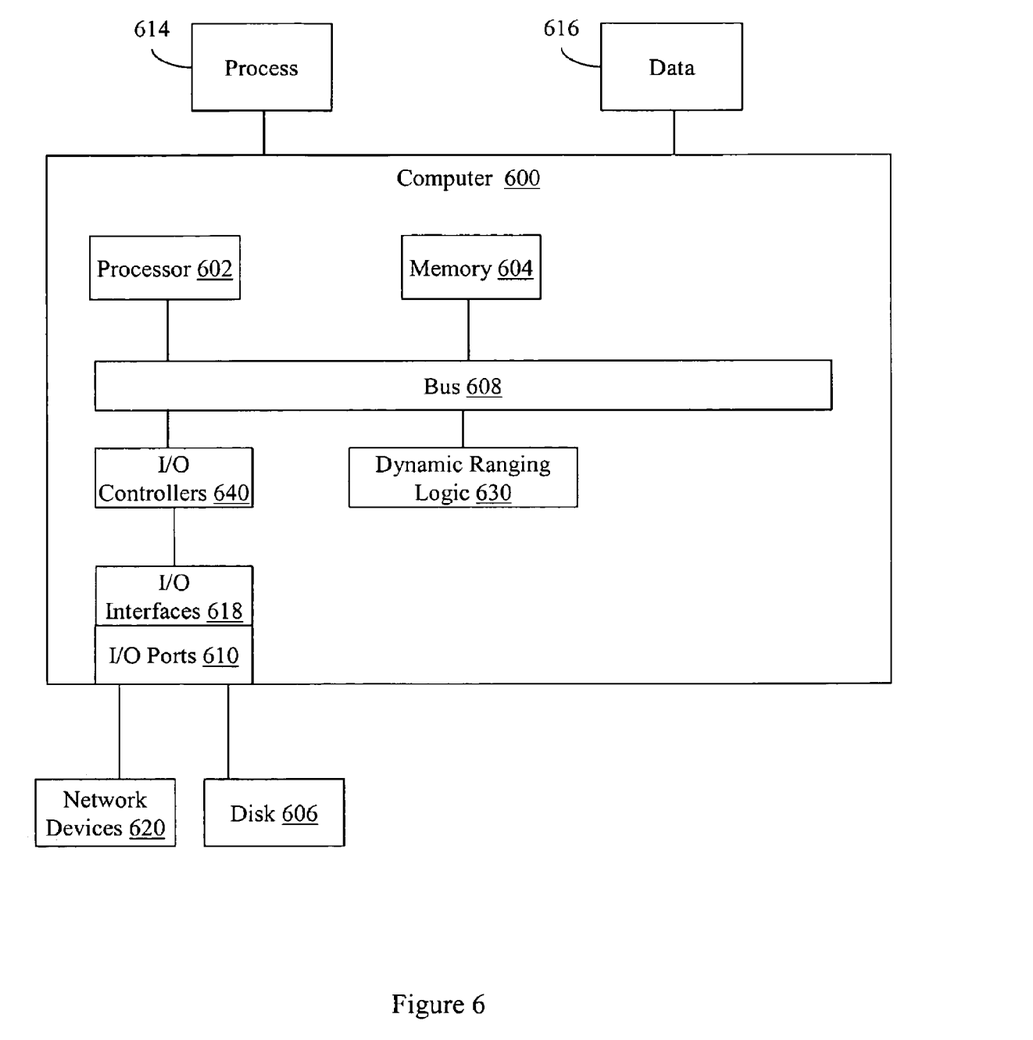
FIG. 6 illustrates an example computing environment in which example systems and methods illustrated herein can operate.

FIG. 6 illustrates an example computing device in which example systems and methods described herein may operate. The example computing device may be a computer 600 that includes a processor 602, a memory 604, and input/output ports 610 operably connected by a bus 608. In one example, the computer 600 may include a dynamic ranging logic 630 that is configured to facilitate dynamic materialized view ranging. The dynamic ranging logic 630 may provide means (e.g., hardware, software, firmware) for creating a data structure (e.g., materialized view) and an expression (e.g., containment expression) that help identify a table (e.g., materialized view) storing results pre-fetched from a database. The identification may be performed at execution time. Thus, dynamic ranging logic 630 may also provide means (e.g., hardware, software, firmware) for returning data from the table in response to a query that includes an execution time bind variable. Which data is returned from the table and whether the table will be used may depend, at least in part, on the value of the bind variable. For example, a containment expression may evaluate to true or false based on the value of the bind variable. If a containment expression evaluates to true, then results for the query may be acquired from a materialized view associated with that containment expression.

Generally describing an example configuration of the computer 600, the processor 602 can be a variety of various processors including dual microprocessor and other multi-processor architectures. The memory 604 can include volatile memory and/or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 606 may be operably connected to the computer 600 via, for example, an input/output interface (e.g., card, device) 618 and an input/output port 610. The disk 606 can include, but is not limited to, devices including a magnetic disk drive, a solid state disk drive, a floppy disk drive, a tape drive, a Zip drive, a flash memory card, and/or a memory stick. Furthermore, the disk 606 can include optical drives including a CD-ROM, a CD recordable drive (CD-R drive), a CD rewriteable drive (CD-RW drive), and/or a digital video ROM drive (DVD ROM). The memory 604 can store processes 614 and/or data 616, for example. The disk 606 and/or memory 604 can store an operating system that controls and allocates resources of the computer 600.

The bus 608 can be a single internal bus interconnect architecture and/or other bus or mesh architectures. While a single bus is illustrated, it is to be appreciated that computer 600 may communicate with various devices, logics, and peripherals using other busses that are not illustrated (e.g., PCIE, SATA, Infiniband, 1394, USB, Ethernet). The bus 608 can be of a variety of types including, but not limited to, a memory bus or a memory controller, a peripheral bus or external bus, a crossbar switch, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

The computer 600 may interact with input/output devices via i/o interfaces 618 and input/output ports 610. Input/output devices can include, but are not limited to, a keyboard, a microphone, a pointing and selection device, cameras, video cards, displays, disk 606, network devices 620, and the so on. The input/output ports 610 can include but are not limited to, serial ports, parallel ports, and USB ports.

The computer 600 can operate in a network environment and thus may be connected to network devices 620 via the i/o devices 618, and/or the i/o ports 610. Through the network devices 620, the computer 600 may interact with a network. Through the network, the computer 600 may be logically connected to remote computers. The networks with which the computer 600 may interact include, but are not limited to, a local area network (LAN), a wide area network (WAN), and other networks. The network devices 620 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), and so on. Similarly, the network devices 620 can connect to WAN technologies including, but not limited to, point to point links, circuit switching networks like integrated services digital networks (ISDN), packet switching networks, and digital subscriber lines (DSL).

Figure 7:
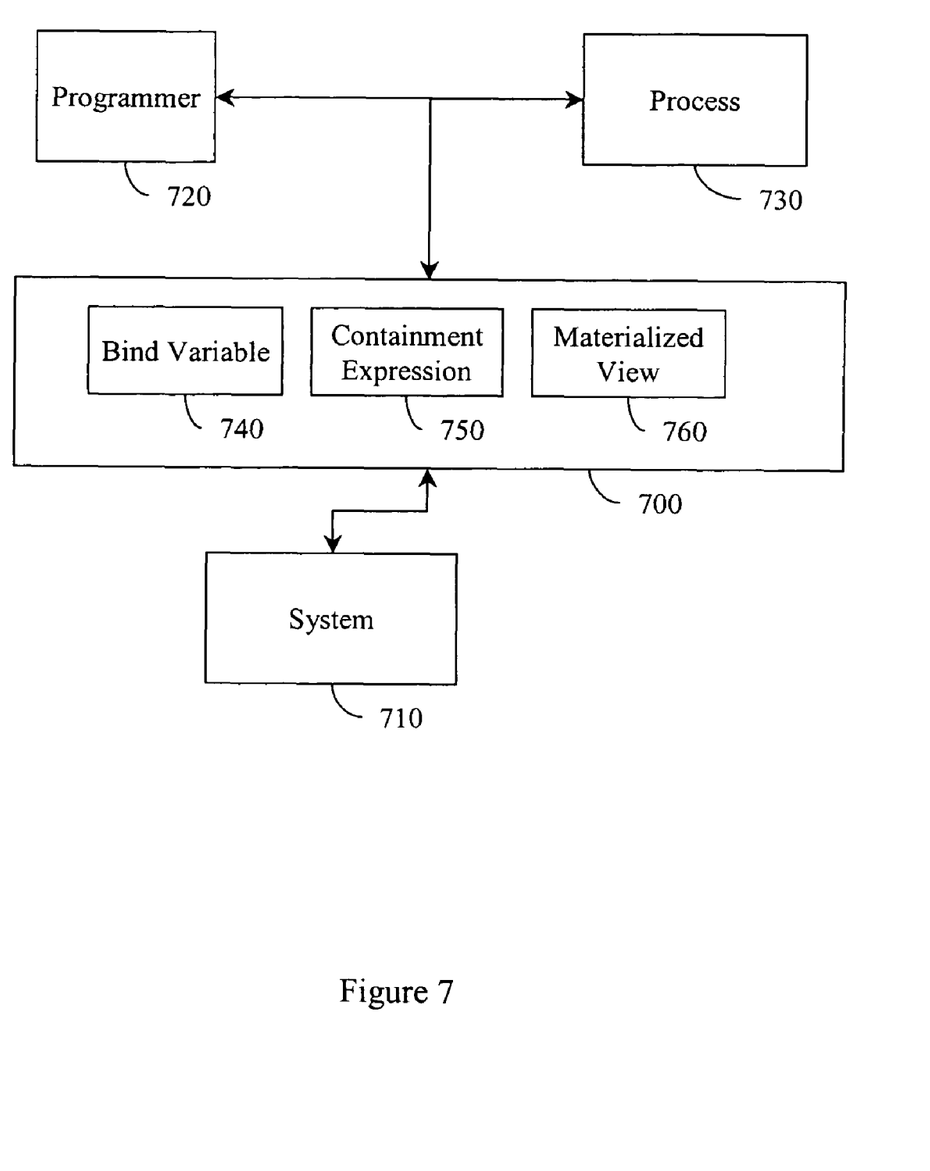
FIG. 7 illustrates an example application programming interface (API).

Referring now to FIG. 7, an application programming interface (API) 700 is illustrated providing access to a system 710 for dynamically ranging over materialized views. The API 700 can be employed, for example, by a programmer 720 and/or a process 730 to gain access to processing performed by the system 710. For example, a programmer 720 can write a program to access the system 710 (e.g., invoke its operation, monitor its operation, control its operation) where writing the program is facilitated by the presence of the API 700. Rather than programmer 720 having to understand the internals of the system 710, the programmer 720 merely has to learn the interface to the system 710. This facilitates encapsulating the functionality of the system 710 while exposing that functionality.

Similarly, the API 700 can be employed to provide data values to the system 710 and/or retrieve data values from the system 710. For example, a process 730 that produces containment expressions can provide a containment expression to the system 710 via the API 700 by, for example, using a call provided in the API 700. In one example of the API 700, a set of application programming interfaces can be stored on a computer-readable medium. The interfaces can be employed by a programmer, computer component, logic, and so on to gain access to a system 710 for dynamically ranging over materialized views. The interfaces can include, but are not limited to, a first interface 740 that communicates a bind variable data, a second interface 750 that communicates a containment expression data, and a third interface 760 that communicates a materialized view data computed by evaluating the containment expression in light of the bind variable data. The bind variable data may include, for example, the name of a bind variable and a resolved value for the bind variable. The "resolved value" may be the actual value provided by a user at execution time. For example, a query analyzed at creation time may read:

Select*from Table Names where first_name=$bv_{name}$ (Q$_9$)

while an execution time instance of the query reads:

Select*from Table names where first_name=janoscz (Q$_{10}$)

The containment expression data may include, for example, a containment expression or portion thereof that is relevant to the bind variable. The materialized view data may include, for example, the name, size, location, and so on of a materialized view that is selected at execution time to support the query based on evaluating the containment expression using the bind variable data.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methods for purposes of describing the systems, methods, and so on described herein. The scope of the invention is to be determined by the appended claims.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A system, comprising:
    a creation time logic, stored on a computer-readable medium to create an association between one or more created materialized views and one or more containment expressions having respective sets of values for a bind variable prior to execution time and to store the association for processing of future queries, where an association indicates that a materialized view contains data useful in determining results for a query when the bind variable has a value in the associated set of values;
    an execution time logic, stored on a computer-readable medium, to receive the query having a bind variable, and to receive a value for the bind variable when the bind variable is resolved, and use the association to determine whether to access the materialized view in the execution plan for the query.

2. The system of claim 1 where the association comprises a containment expression that expresses a range of possible bind variable values for which the materialized view contains data useful for determining results for the query.

3. The system of claim 1 where the execution time logic accesses the materialized view to process the query when the bind variable is resolved to have a value in the set of values associated with the materialized view.

4. The system of claim 3 where the execution time logic accesses a base table to process the query when the bind variable is resolved to have a value that is not in the set of values associated with the materialized view.

5. The system of claim 1 where the creation time logic creates an association between a base table and a set of values for the bind variable for which no materialized view contains useful data and where the execution logic uses the association to determine whether to access the base table in the execution plan for the query.

6. The system of claim 1 where the execution time logic comprises a query rewrite logic to rewrite the query to access the materialized view if the bind variable resolves to a value in the set.

7. The system of claim 6 where the query rewrite logic rewrites the query to include a union of a set of one or more child query blocks that reference a containment expression and a materialized view, where each respective child query blocks accesses a respective materialized view when the respective containment expression evaluates to true.

8. The system of claim 1 where the one or more materialized views are created based, at least in part, on a probability distribution for values for the bind variable, the probability distribution being provided by a probability distribution logic.

9. A method comprising:
creating an association between a created materialized view and a containment expression having a respective set of one or more possible values for a bind variable where the association indicates that the respective materialized view contains data useful in determining results for a query when the bind variable has a value that is in the respective set and storing the association in memory for evaluation for processing of future queries;
receiving, after the association has been created, the query that includes a bind variable;
after the bind variable is resolved, using the association to determine whether to access the materialized view in the execution plan for the query.

10. The method of claim 9 comprising creating an association between one or more respective materialized views and respective sets of values for the bind variable.

11. The method of claim 10 comprising accessing a materialized view to process the query when the bind variable is resolved to be a value that is in the set of values associated with the materialized view.

12. The method of claim 10 comprising accessing a base table to process the query when the bind variable is resolved to be a value that is not in the set of values associated with any of the one or more materialized views.

13. The method of claim 9 comprising creating an association between a base table and a set of values for the bind variable for which no materialized view contains useful data and using the association to determine whether to access the base table in the execution plan for the query.

14. The method of claim 9 comprising rewriting the query to access the materialized view if the bind variable resolves to a value in the set.

15. The method of claim 9 comprising rewriting the query to include a union of a set of one or more child query blocks that reference a containment expression and a materialized view, where each respective child query blocks accesses a respective materialized view when the respective containment expression evaluates to true.

16. The method of claim 9 where the one or more materialized views are created based, at least in part, on a probability distribution for values for the bind variable, the probability distribution being provided by a probability distribution logic.

17. A non-transitory computer-readable medium storing processor executable instructions operable to perform a method, the method comprising:
creating an association between a created materialized view and a containment expression having a respective set of one or more possible values for a bind variable, where the association indicates that the respective materialized view contains data useful in determining results for a query when the bind variable has a value that is in the respective set and storing the association in memory for evaluation for processing of future queries;
receiving, after the association has been created, the query that includes a bind variable;
after the bind variable is resolved, using the association to determine whether to access the materialized view in the execution plan for the query.

18. The non-transitory computer-readable medium of claim 17 where the instructions comprise accessing the materialized view to process the query when the bind variable is resolved to be a value that is in the set of values associated with the materialized view.

19. The non-transitory computer-readable medium of claim 18 where the instructions comprise accessing a base table to process the query when the bind variable is resolved to be a value that is not in the set of values associated with any of the one or more materialized views.

20. The non-transitory computer-readable medium of claim 17 where the instructions comprise creating an association between a base table and a set of values for the bind variable for which no materialized view contains useful data and using the association to determine whether to access the base table in the execution plan for the query.

21. The non-transitory computer-readable medium of claim 17 where the instructions comprise rewriting the query to access the materialized view if the bind variable resolves to a value in the set.

22. The non-transitory computer-readable medium of claim 21 where the instructions comprise rewriting the query to include a union of a set of one or more child query blocks that reference a containment expression and a materialized view, where each respective child query blocks accesses a respective materialized view when the respective containment expression evaluates to true.

23. The non-transitory computer-readable medium of claim 17 where the set of materialized views is determined based, at least in part, on a probability distribution for values for the bind variable, the probability distribution being provided by a probability distribution logic.

24. A system, comprising:
means for creating associations between a set of created materialized views and one or more containment expressions having respective sets of one or more possible values for a bind variable and to store the association for processing of future queries, and where an association indicates that a respective materialized view contains data useful in determining results for the query when the bind variable has a value that is in the respective set; and means for using the associations to determine whether to access one or more of the set materialized views in the execution plan for the query after the bind variable is resolved.

25. The system of claim 1 where the one or more materialized views are configured to provide non-overlapping coverage for a set of all possible values for a bind variable associated with a query.

26. The method of claim 10 where the one or more materialized views are configured to provide non-overlapping coverage for a set of all possible values for a bind variable associated with a query.

27. The non-transitory computer-readable medium of claim 17 where one or more materialized views are configured to provide non-overlapping coverage for a set of all possible values for a bind variable associated with a query.

* * * * *

UNITED STATES PATENT AND TRADEMARK OFFICE
CERTIFICATE OF CORRECTION

PATENT NO.      : 8,204,876 B2
APPLICATION NO. : 11/374593
DATED           : June 19, 2012
INVENTOR(S)     : Bello et al.

Page 1 of 1

It is certified that error appears in the above-identified patent and that said Letters Patent is hereby corrected as shown below:

In column 6-7, lines 67-1, delete "servelet" and insert -- servlet --, therefor.

Signed and Sealed this
Fourth Day of September, 2012

David J. Kappos
*Director of the United States Patent and Trademark Office*